US012649078B2

(12) United States Patent
Shakespeare

(10) Patent No.: US 12,649,078 B2
(45) Date of Patent: Jun. 9, 2026

(54) AUTOMATIC FIRE SPRINKLER FLOW TEST DEVICE

(71) Applicant: John Shakespeare, Algona, WA (US)

(72) Inventor: John Shakespeare, Algona, WA (US)

( * ) Notice: Subject to any disclaimer, the term of this patent is extended or adjusted under 35 U.S.C. 154(b) by 0 days.

(21) Appl. No.: 18/780,472

(22) Filed: Jul. 23, 2024

(65) Prior Publication Data

US 2026/0145015 A1 May 28, 2026

(51) Int. Cl.
*A62C 37/50* (2006.01)

(52) U.S. Cl.
CPC .................................... *A62C 37/50* (2013.01)

(58) Field of Classification Search
CPC ...................................................... A62C 37/50
See application file for complete search history.

(56) References Cited

U.S. PATENT DOCUMENTS 2,074,157 A * 3/1937 Allen ................. A62C 99/0027
222/3
3,227,219 A * 1/1966 Boyer .................... A62C 37/50
239/66
3,424,426 A * 1/1969 Neff ...................... F16K 31/404
251/30.03
4,333,491 A * 6/1982 Knubley ................. B60S 5/046
137/227
5,179,969 A * 1/1993 Peterson ................... F04F 5/46
137/142
5,222,529 A * 6/1993 Zoltan ....................... B65B 1/16
406/146
8,573,315 B1 * 11/2013 Taylor .................... A62C 35/68
169/13
10,317,264 B1 * 6/2019 Nesselle ................. G01M 1/00
2013/0126194 A1 * 5/2013 Kjellberg ............... A62C 37/50
169/37
2021/0394002 A1 * 12/2021 Laskaris ................ A62C 31/00
2022/0176180 A1 * 6/2022 Kramer .................. A62C 37/44

* cited by examiner

*Primary Examiner* — Patrick C Williams
(74) *Attorney, Agent, or Firm* — Stevens Patent Law LLC; James Stevens

(57) ABSTRACT

An Automatic Fire Sprinkler Flow Test Device that efficiently measures water flow from fire sprinkler systems. The device comprises two tools, each equipped with an electronic ball valve or solenoid valve, connected to a power source and controlled by a switch. By automating valve operations, the device allows a single person to perform accurate flow tests for fire sprinkler systems, ensuring compliance with NFPA standards while eliminating the need for two personnel traditionally required for manual testing. The device's quick valve response time enables precise flow measurements and improved efficiency in both residential and commercial properties.

2 Claims, 9 Drawing Sheets

400

900

AUTOMATIC FIRE SPRINKLER FLOW TEST DEVICE

BACKGROUND

Field of the Invention

The present invention relates to the field of fire safety equipment, specifically to an automatic tool designed to perform flow tests on fire sprinkler systems. This tool is essential for ensuring compliance with NFPA 13D, NFPA 13R, and NFPA 13 standards for both residential and commercial properties.

Discussion of the State of the Art

Traditionally, flow tests for fire sprinkler systems required two personnel to manually open and close valves connected to the sprinkler heads, measuring the water flow over a specified period (usually one minute or 30 seconds). This manual process is labor-intensive and can be inconvenient, especially when coordinating the presence of two individuals on-site. The Automatic Fire Sprinkler Flow Test Device revolutionizes this process by automating valve operations, allowing a single person to perform the test efficiently and accurately.

BRIEF SUMMARY

Accordingly, the inventor has conceived and reduced to practice, an Automatic Fire Sprinkler Flow Test Device. The Automatic Fire Sprinkler Flow Test Device is designed to measure the water flow from two fire sprinkler heads simultaneously, providing a reliable and consistent method to assess the performance of sprinkler systems. The device comprises two identical tools, each equipped with an electronic ball valve or a solenoid valve, which are wired to a 110V power source and controlled by a switch. When activated, the valves open or close within one second, enabling precise flow measurements

DETAILED DESCRIPTION

Detailed Description of Embodiments and Aspects

The Automatic Fire Sprinkler Flow Test Device provides an efficient solution for testing fire sprinkler systems in both residential and commercial properties. The device is designed to ensure compliance with NFPA 13D, NFPA 13R, and NFPA 13 standards while simplifying the testing process.

Figure 1:
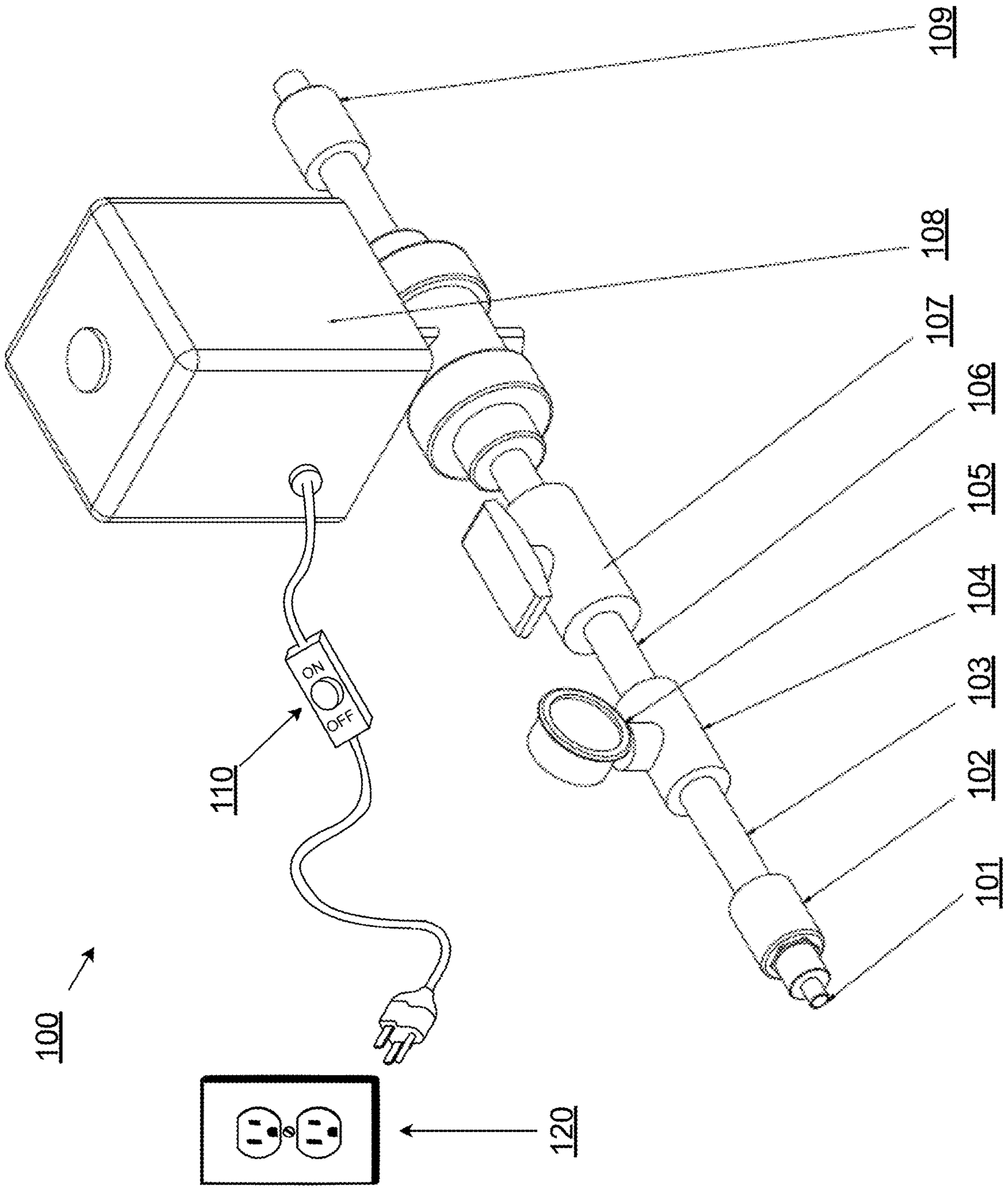
FIG. 1 is a general diagram illustrating the Automatic Fire Sprinkler Flow Test Device assembly 100 with its components 101-110.

The complete assembly, as shown in FIG. 1, comprises multiple components 101-110 that work together to create a functional flow testing unit. The device is constructed primarily from CPVC components with brass fittings where required for durability and compatibility with existing fire sprinkler systems.

Figure 2:
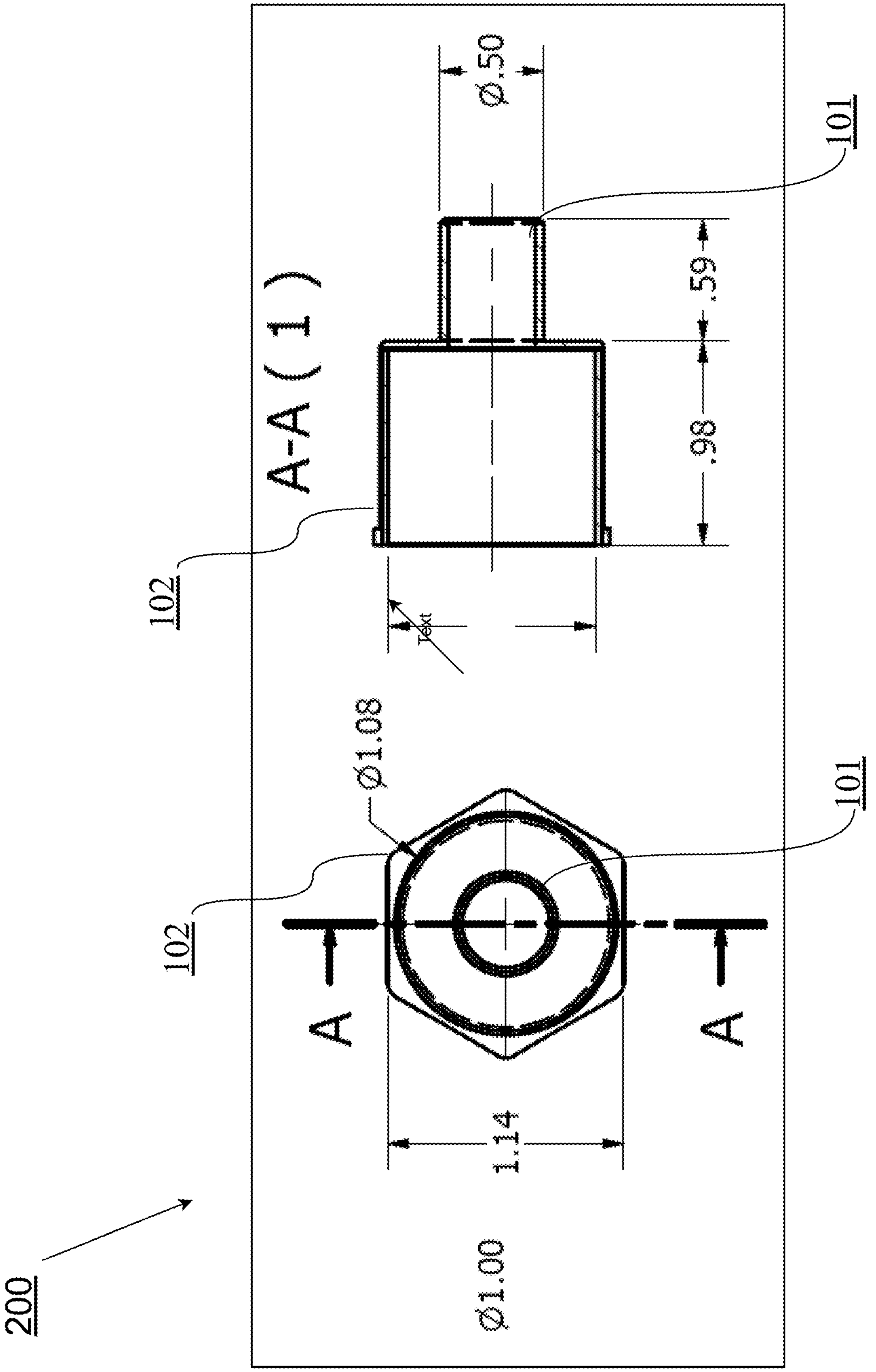
FIG. 2 shows a product data sheet excerpt 200 wherein the component 101 is a brass nipple and component 102 is a head adapter.

At the core of the device are connections that interface with the fire sprinkler system. The brass nipple 101, shown in FIG. 2, is designed to connect to the device's head adapter 102.

Together, these components allow for proper connection to the fire sprinkler system fitting.

Figure 3:
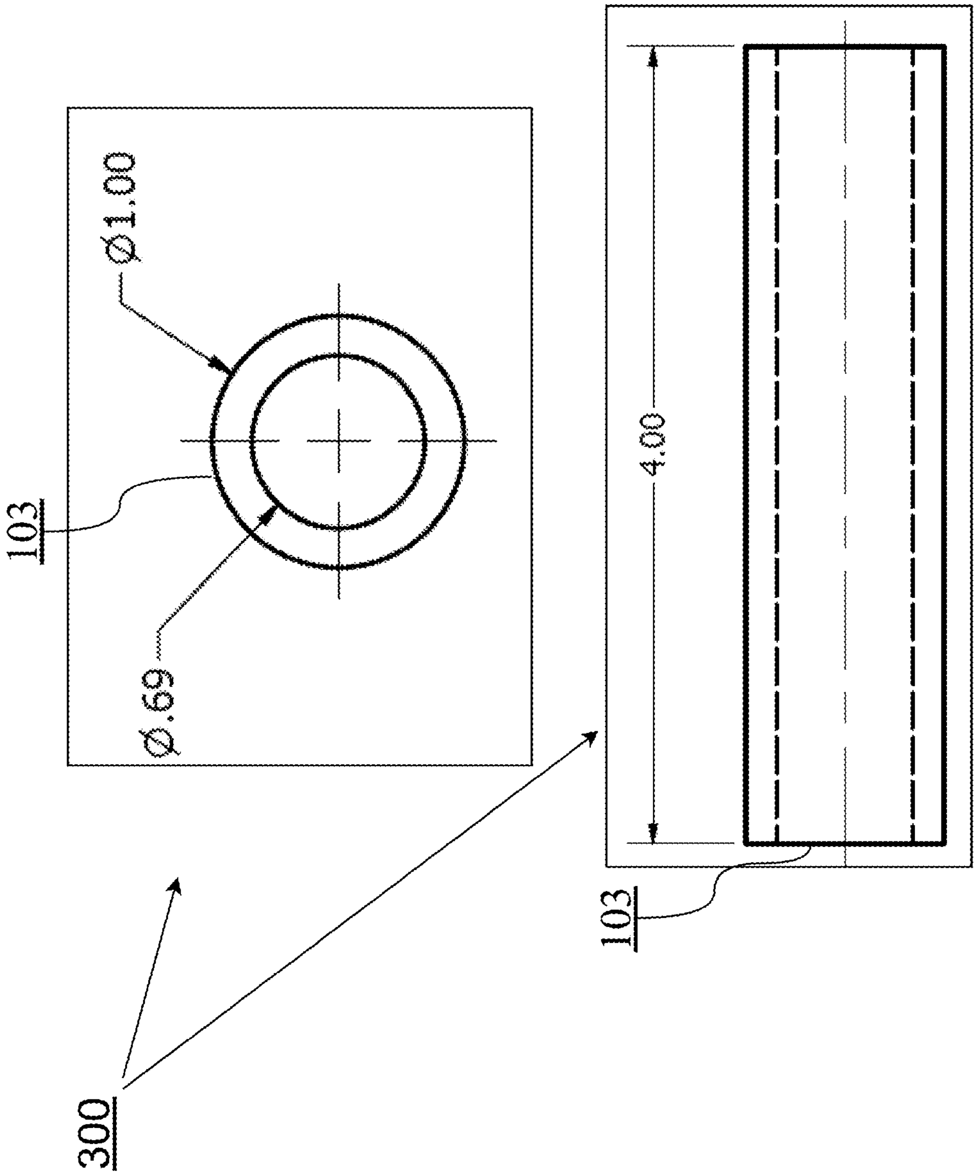
FIG. 3 shows a product data sheet excerpt 300 wherein the component 103 is a 1" CPVC pipe that is 4" long.

The 1" CPVC pipe 103 that is 4" long, as shown in FIG. 3, serves as a connection segment in the assembly. This pipe ensures proper spacing and alignment between components while maintaining adequate water flow.

Figure 4:
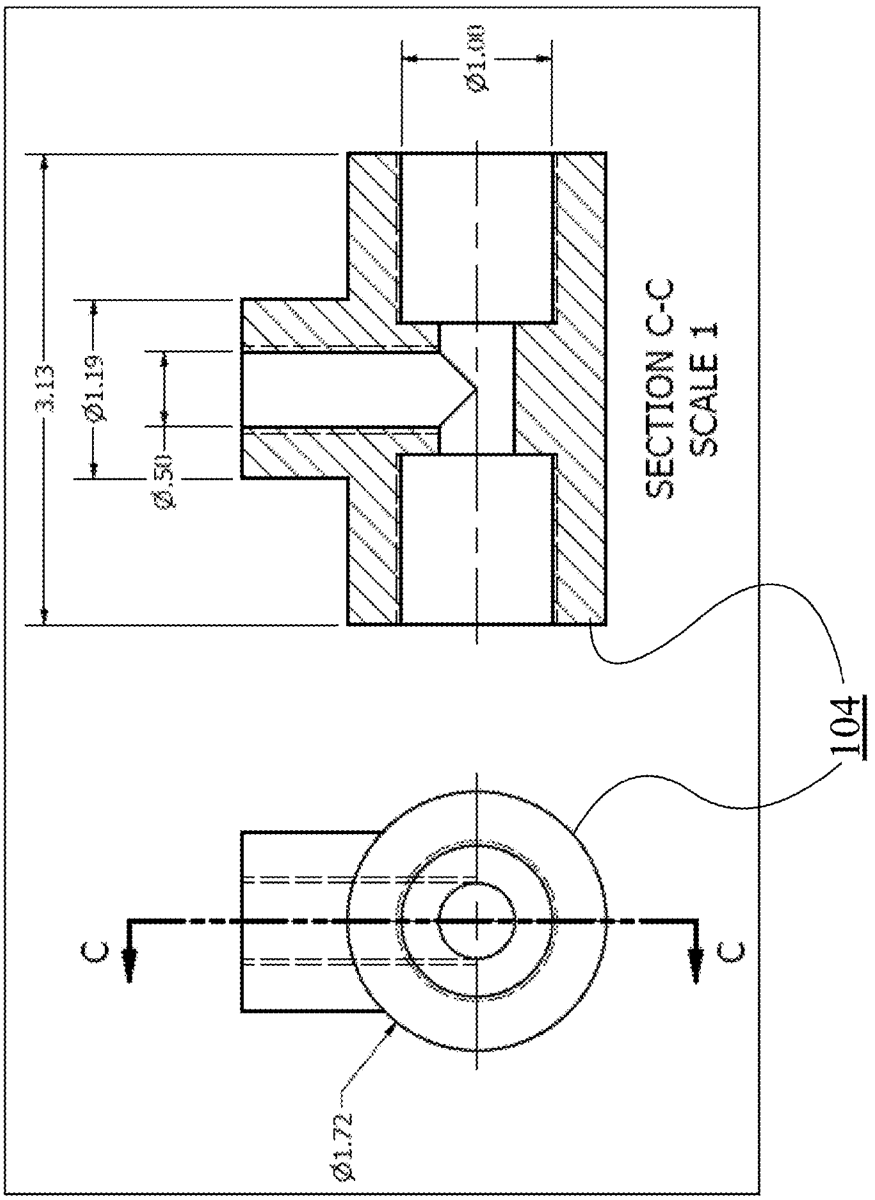
FIG. 4 shows a product data sheet excerpt 400 wherein the component 104 is a TEE CPVC fitting.

The TEE CPVC fitting 104, illustrated in FIG. 4, serves as a junction that directs water flow while also providing a mounting point for the water gauge. This component is for the measurement aspect of the testing device.

Figure 5:
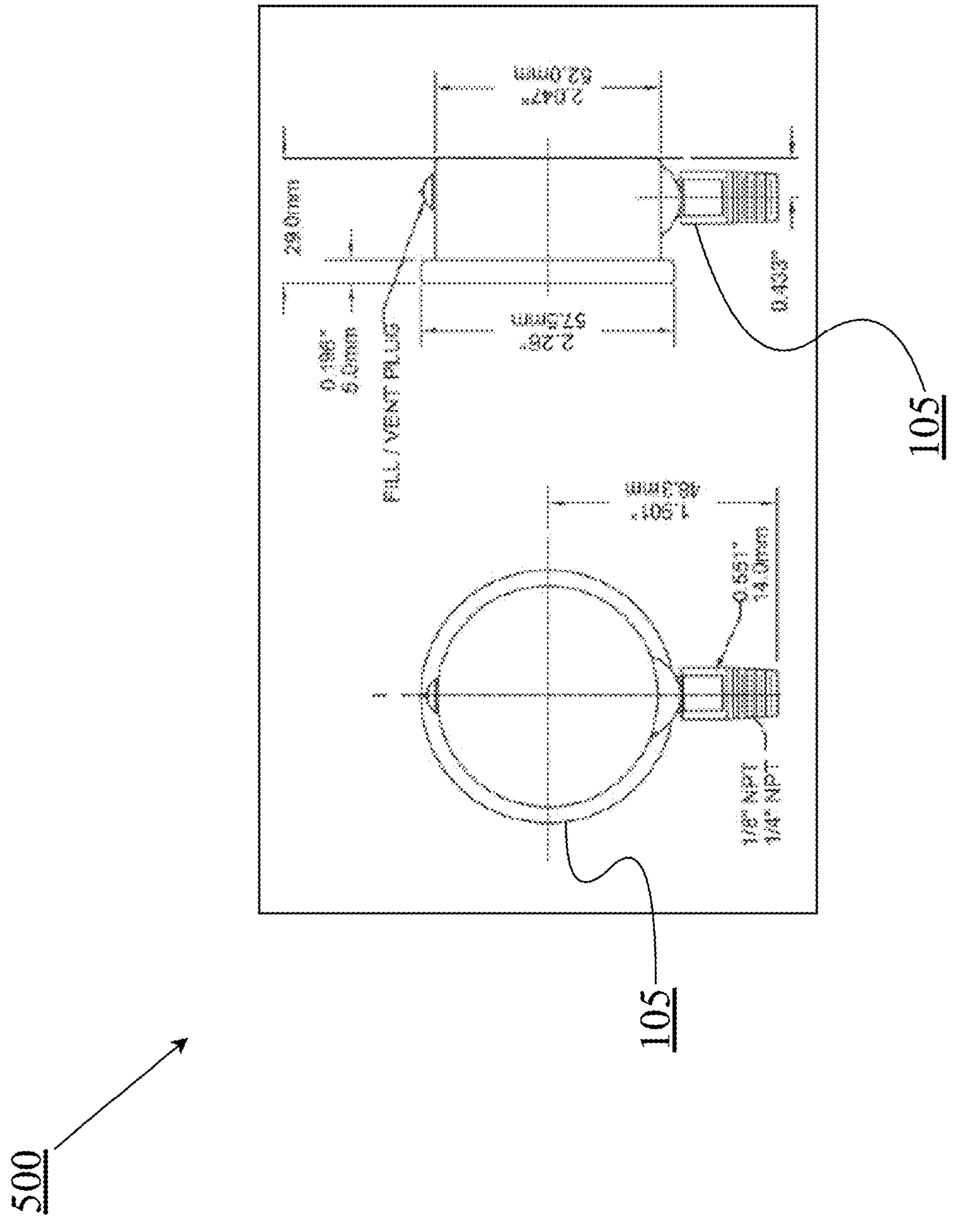
FIG. 5 shows a product data sheet excerpt 500 wherein the component 105 is a water gauge that displays the available static pressure in the system.

As shown in FIG. 5, the water gauge 105 displays the available static pressure in the system, which is used for verifying that the sprinkler system meets the required specifications.

The gauge is properly fitted to ensure accurate pressure readings during testing.

Figure 6:
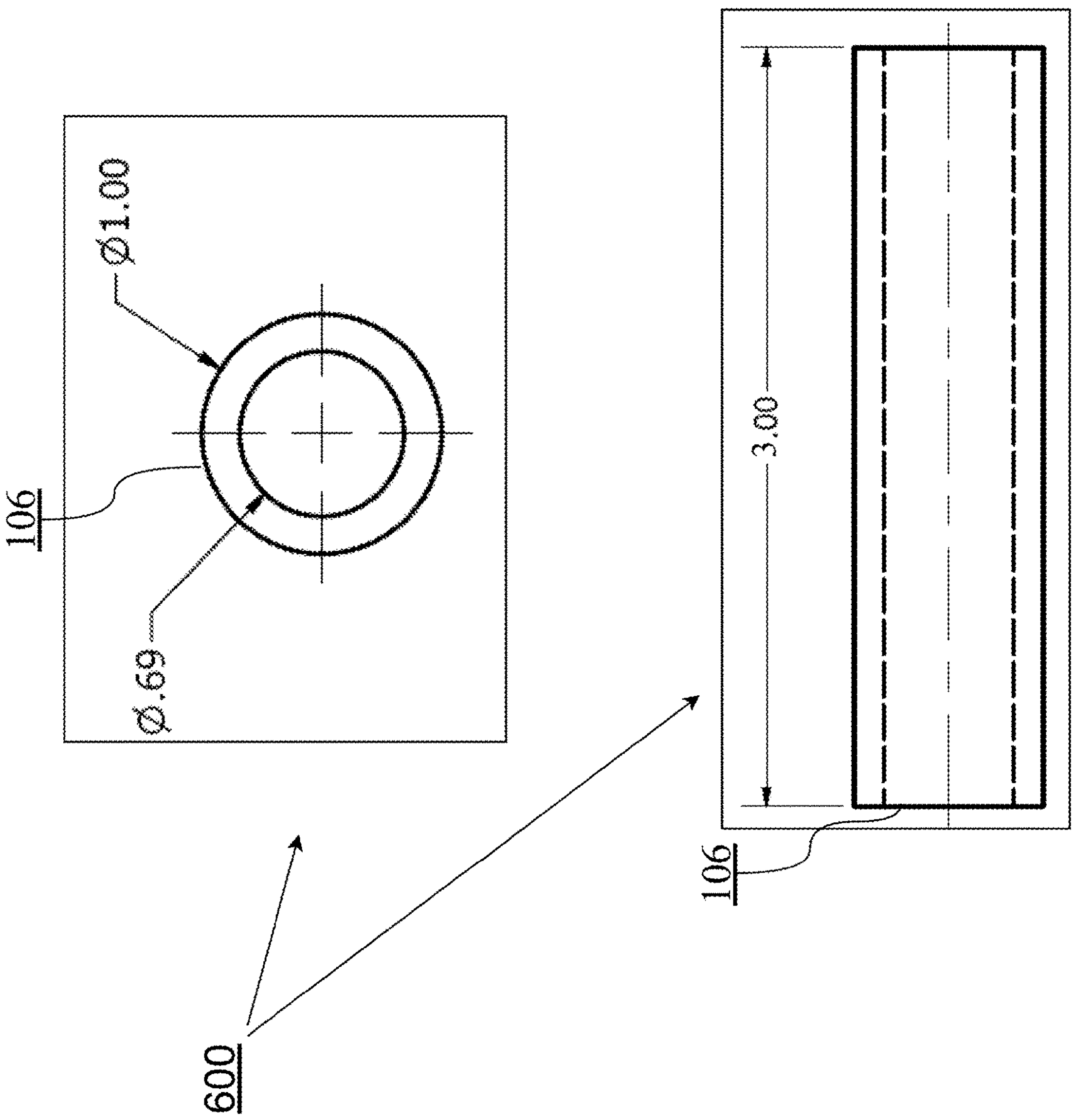
FIG. 6 shows a product data sheet excerpt 600 wherein the component 106 is a 1" CPVC pipe that is 3" long.

The 1" CPVC pipe 106 that is 3" long, depicted in FIG. 6, provides another connection segment in the assembly. This component helps maintain proper configuration and distance between operational elements of the device.

Figure 7:
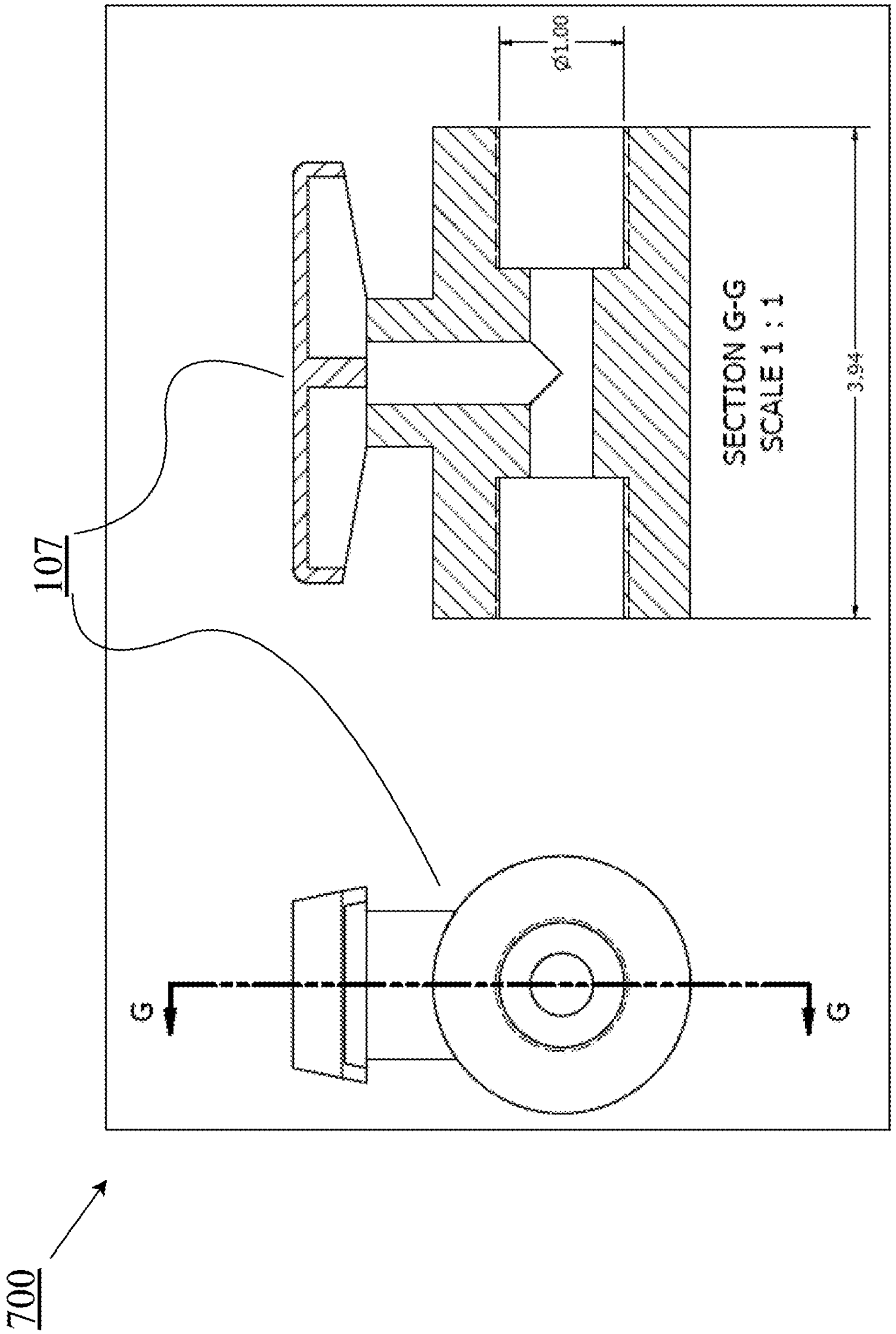
FIG. 7 shows a product data sheet excerpt 700 wherein the component 107 is a manual valve that opens and closes.

The manual valve 107, shown in FIG. 7, provides manual control over water flow, allowing the operator to shut off water without engaging the automatic valve 108. This serves as both a safety feature and a backup control mechanism.

Figure 8:
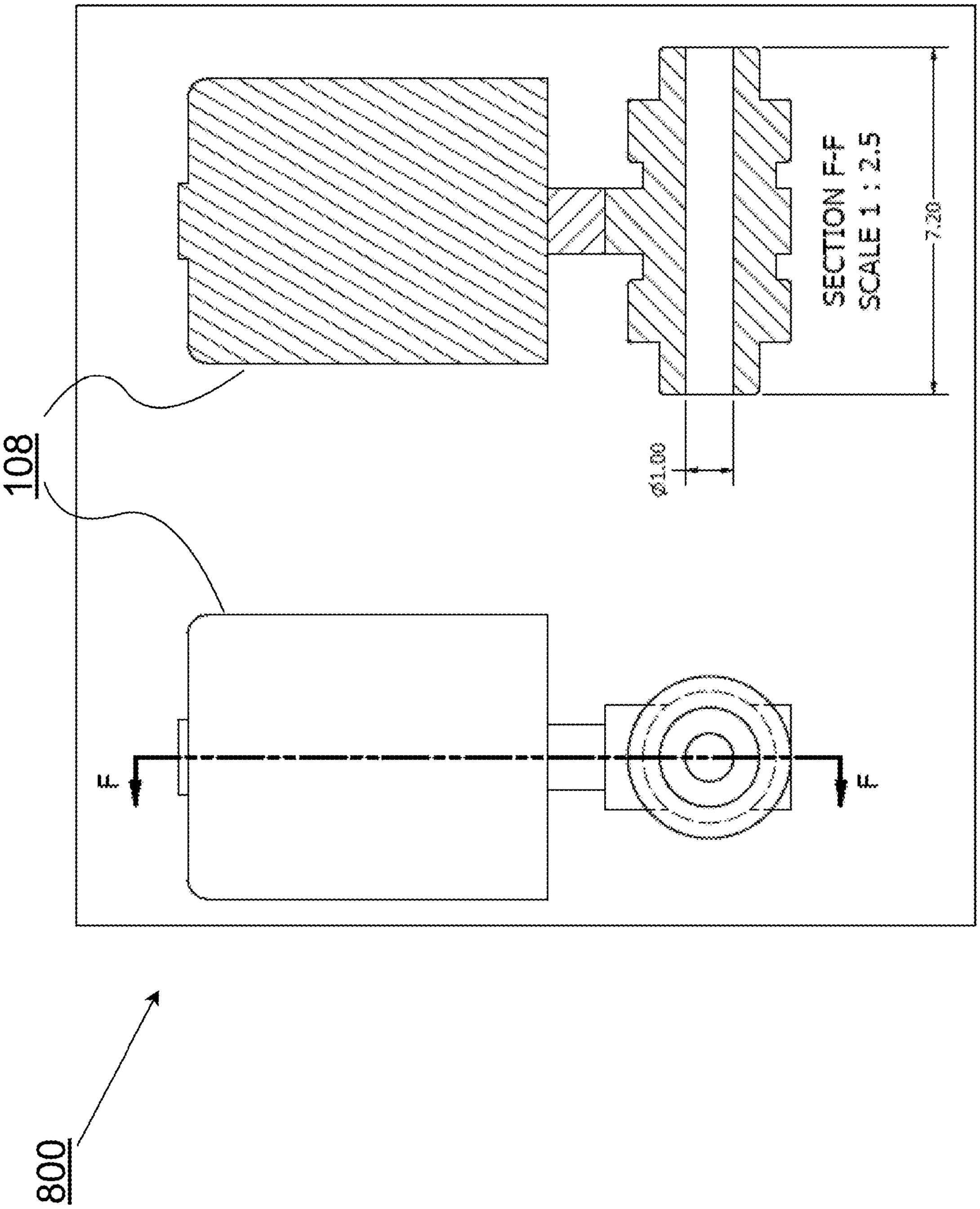
FIG. 8 shows a product data sheet excerpt 800 wherein the component 108 is an automatic valve that opens and closes at the press of a button FIGS. 1, 110.

The automatic valve 108, illustrated in FIG. 8, is the technological advancement that enables single-person operation. This valve opens and closes at the press of a button 110 and is wired to a 110V power source 120 or is battery operated.

Figure 9:
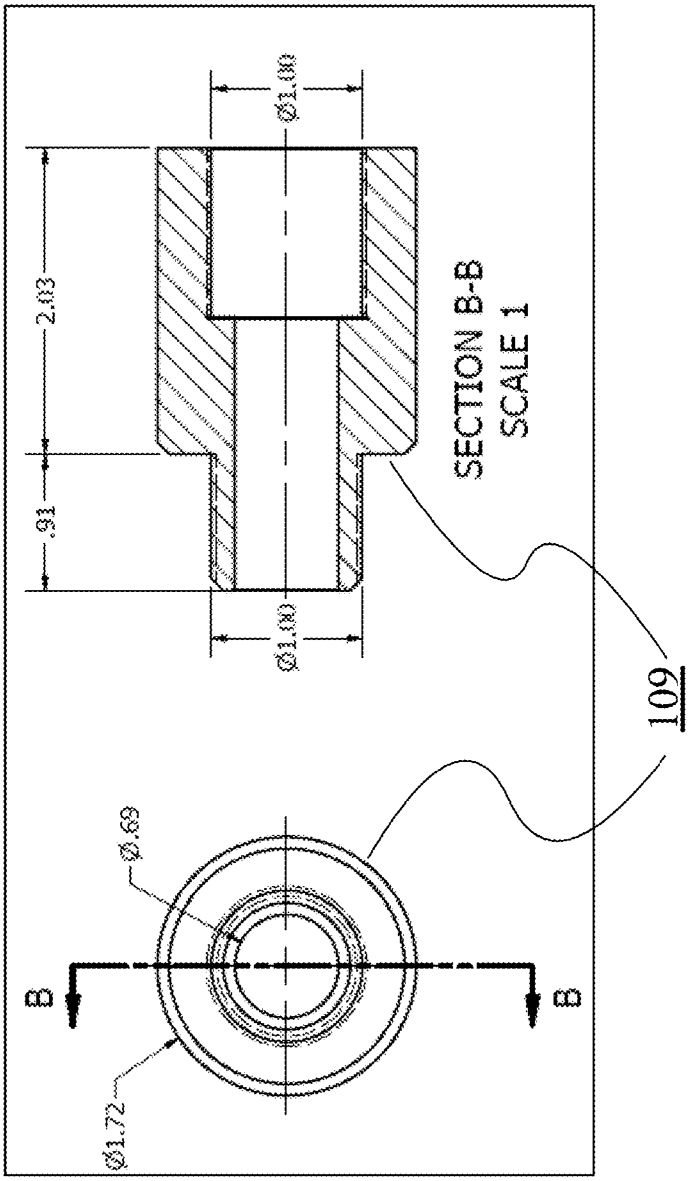
FIG. 9 shows a product data sheet excerpt 900 wherein the component 109 is a head adapter.

The device is completed with a head adapter 109, as shown in FIG. 9, which enables proper connection and water flow for testing purposes.

In operation, the device is attached to the sprinkler system in place of the sprinkler head. The operator can then use the automatic valve 108 to precisely control water flow for the required test duration. The water gauge provides immediate feedback on system pressure, while the flow rate can be measured using standard collection methods. Once testing is complete, the device can be easily removed and the original sprinkler head reinstalled.

This automated approach significantly improves efficiency by requiring only one person to conduct tests that traditionally required two people coordinating valve operations. The precision of the automatic valve ensures accurate test results, and the durable construction of the device allows for repeated use across multiple testing sites.

While the preferred embodiment is described above, it can be appreciated by one having ordinary skill in the art that other materials and dimensions can be used.

The invention claimed is:

1. An automatic tool for conducting flow tests on fire sprinkler systems, comprising two identical devices, each with an electronic ball valve or solenoid valve, wired to a 110 V power source and controlled by a switch, wherein the valves open and close within one second to measure water flow accurately.

2. The tool of claim 1, wherein each identical device further includes a brass nipple, a female adapter, a CPVC pipe, a Tee CPVC thread, a water gauge, a manual valve, a head adapter, and wherein the switch is an electronic control switch.

* * * * *